United States Patent [19]
Yamauchi et al.

[11] Patent Number: 5,768,375
[45] Date of Patent: Jun. 16, 1998

[54] CATV SYSTEM

[75] Inventors: Toshiaki Yamauchi; Masafumi Furui, both of Yokohama, Japan

[73] Assignee: Matsushita Electric Industrial Co., Ltd., Osaka, Japan

[21] Appl. No.: 519,414

[22] Filed: May 24, 1995

[30] Foreign Application Priority Data

Sep. 6, 1994 [JP] Japan ................................. 6-212408

[51] Int. Cl.⁶ ........................... H04N 7/167; H04L 9/00
[52] U.S. Cl. ...................... 380/10; 380/9; 380/20; 380/49; 348/6; 348/10; 348/12; 455/3.1; 455/5.1; 455/6.1; 455/6.2; 455/6.3
[58] Field of Search ................. 380/9, 10, 20, 380/49, 50, 15; 455/3.1, 4.1, 4.2, 5.1, 6.1, 6.2, 6.3; 348/6, 7, 9, 10, 11, 12

[56] References Cited

U.S. PATENT DOCUMENTS

| | | |
|---|---|---|
| 4,860,379 | 8/1989 | Schoeneberger et al. |
| 5,235,680 | 8/1993 | Bijnagte |
| 5,412,720 | 5/1995 | Hoarty .................................. 380/15 |
| 5,530,754 | 6/1996 | Garfinkle .......................... 380/20 X |

*Primary Examiner*—Bernarr E. Gregory
*Attorney, Agent, or Firm*—Watson Cole Stevens Davis, P.L.L.C.

[57] ABSTRACT

An image-data-system host computer outputs image data, the protocol of which is not disclosed. The image data outputted from the image-data-system host computer is transmitted via an image-data-system terminal and a video control unit to a data management unit. On the other hand, the data management unit decrypts in accordance with a protocol and acquires text data outputted from a text-system host computer whose protocol is disclosed. A signal transmitting unit transmits the image data and the text data outputted from the data management unit via a coaxial cable to a display unit. The display unit displays images in response to the image data and the text data received from the signal transmitting unit.

7 Claims, 11 Drawing Sheets

FIG.4 FLOW OF TEXT DATA

CATV SYSTEM

BACKGROUND OF THE INVENTION

1. Field of the Invention

The present invention generally relates to a CATV (cable television) system. More specifically, the present invention is directed to such a CATV system for transmitting/receiving image information, voice information, text data, and computer graphic information, utilized in an airport management system and the like.

2. Description of the Related Art

In the conventional CATV system, the data outputted from the host computer is sent out to the coaxial cable in the following manner. That is, the software firm which has developed the protocol of the host computer is required to open the specification of the software (protocol disclosure). A program fitted to the specification of the disclosed software is developed to decrypt the above-described data, and then this data is rewritten into such a format by which the terminal connected to the coaxial cable can receive this formatted data (protocol conversion). The term "protocol-conversion" means conversion of the formatted data in accordance with the protocol.

That is, in the above-described conventional CATV system, since the data outputted from the host computer is protocol-converted to rewrite the data, this rewritten data can be transmitted via the coaxial cable to the terminal.

However, in this conventional CATV system, the software developing firm which has developed the software of the host computer need to disclose the protocol. Under such a circumstance, when the software developing firm refuses to disclose this protocol, there is a problem that the information of this host computer cannot be transmitted. There is a further problem that in order to transmit the information of this host computer, the above-described conventional CATV system must be newly equipped with a communication system dedicated to this host computer.

SUMMARY OF THE INVENTION

The present invention has been made to solve such problems of the conventional CATV system, and therefore, has an object to provide such an excellent CATV system capable of transmitting data of a host computer, whose protocol is not disclosed, via the same coaxial cable as that for such data of a host computer whose protocol is disclosed.

A CATV system, according to the present invention, is comprised of:

- a text-system host computer for outputting text data, a protocol of which is disclosed;
- image-data-system host computer for outputting image data, a protocol of which is not disclosed;
- an image-data-system terminal connected to said image-data-system host computer, for displaying an image in response to said image data outputted from said image-data-system host computer;
- a video control unit connected to said image-data-system terminal, for acquiring said image data from said image-data-system terminal to process said acquired image data;
- a data management unit including decrypting means for acquiring the text data from the text-system host computer according to the disclosed protocol, said data management unit acquiring the processed image data from said video control unit and outputting the text data and the processed image data;

a signal transmitting unit connected to said data management unit, for transmitting said image data and said text data both of which are outputted from said data management unit;

a coaxial cable for transmitting said image data and said text data outputted from said signal transmitting unit; and a display unit connected via said coaxial cable to said signal transmitting unit, for displaying an image thereon in response to said image data and said text data both of which are acquired from said signal transmitting unit.

As a consequence, in the CATV system of the present invention, the image data outputted from the image-data-system host computer whose protocol is not disclosed is received via the image-data-system terminal and the video control unit to the data management unit, and is transmitted via the signal transmitting unit and the coaxial cable to the display unit. Then, since the image-data-system host computer whose protocol is not disclosed can be employed in a similar manner to the text-system host computer whose protocol is disclosed, no communication means exclusively used to the image-data-system host computer is required and thus manufacturing cost of this CATV system can be reduced.

DESCRIPTION OF THE PREFERRED EMBODIMENTS

(First Embodiment)

Figure 1:
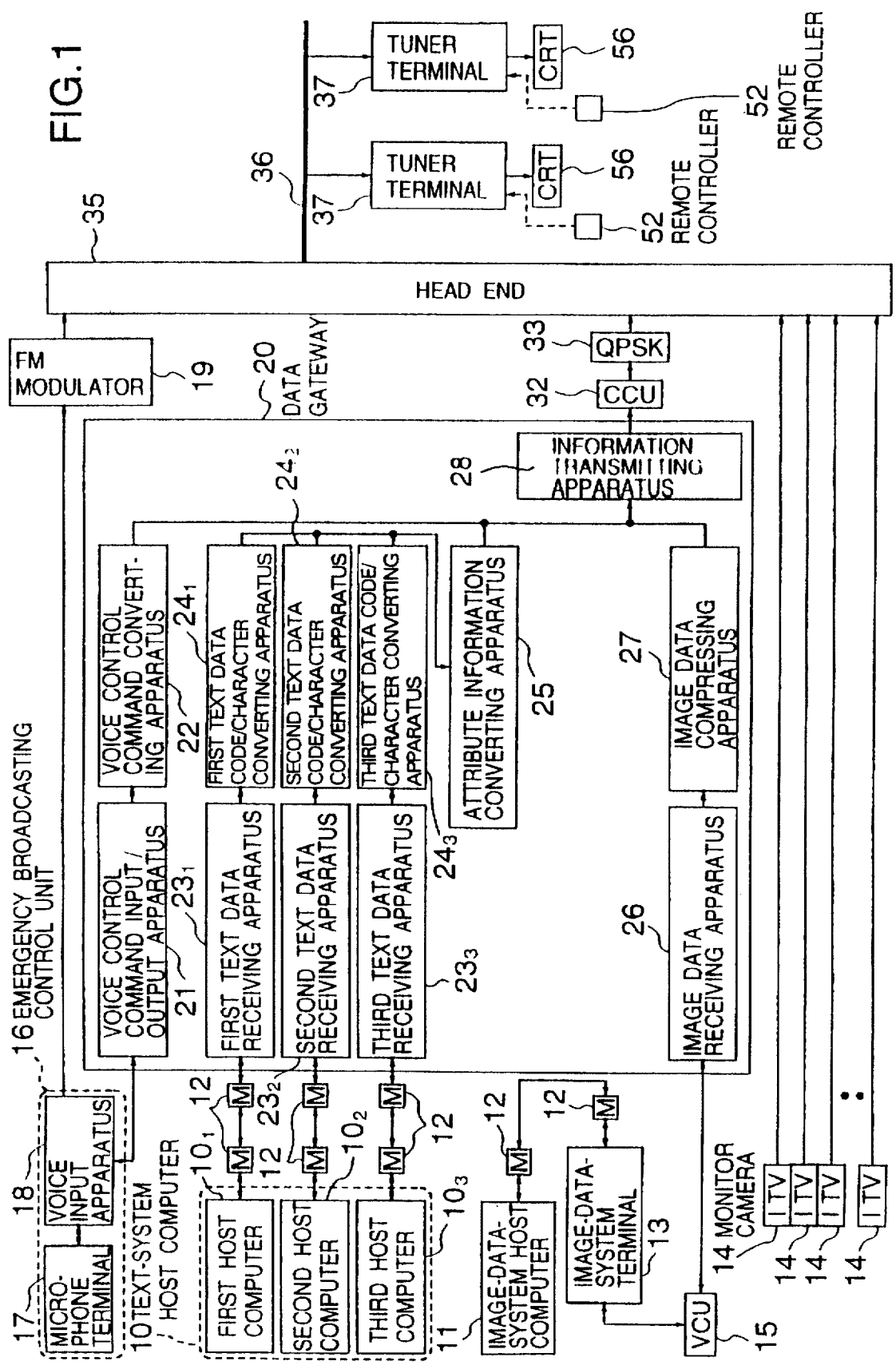
FIG. 1 partially shows an arrangement of a CATV system according to a first embodiment of the present invention.

FIG. 1 partially indicates an arrangement of a CATV (Cable Television) system according to a first embodiment of the present invention. The CATV system according to the first embodiment is directed to monitor an inside of a building, to broadcast in case of emergency, and to display information about flight schedules in an airport and the like.

The CATV system according to the first embodiment includes a text-system host computer 10, an image-data-system host computer 11, a plurality of modems (modulator/demodulator) 12, an image-data-system terminal 13, a plurality of monitor cameras 14, and a video data control unit (VCU) 15. The CATV system further includes an emergency broadcasting control unit 16, a frequency-modulation modulator (FM modulator) 19, a data gateway (D/G) 20, a communication control unit (CCU) 32, a quadrature phase shift keying modulator (QPSK modulator) 33, a head end (H/E) 35, a plurality of tuner terminals 37, a plurality of display units (CRT) 56, and a remote controller 52 provided on each of the display units 56.

The text-system host computer 10 is arranged by first to third host computers $10_1$ to $10_3$ each having information about a flight schedule (navigation), whose protocol is disclosed. The first to third host computers $10_1$ to $10_3$ are connected via two modems 12 to the data gateway 20. On the other hand, the image-data-system host computer 11 has the information about the flight schedule similar to the text-system host computer 10, but has a protocol which is not disclosed. The image-data-system host computer 11 is connected via two modems 12 to the image-data-system terminal 13.

The image-data-system terminal 13 corresponds to a computer which displays an image in response to the image data sent from the image-data-system host computer 11, and has a 16-color CRT interface constructed of 640 dots×480 lines. The video data control unit 15 connected between the image-data-system terminal 13 and the data gateway 20 corresponds to an image control unit for acquiring the image data (image information), and stores therein only one image selected from the image data acquired from the CRT interface of the image-data-system terminal 13. The video data control unit 15 separates the stored image data having an amount of one image into 16 sorts of pallet (color information) data and plain (color positional information) data, and there-after performs the following process with respect to the separated data. The resulting image data (pallet data and plain data) are sent out to the data gateway 20. The monitor camera 14 is for example an ITV (industrial television) camera installed inside and/or outside a building in an airport.

The emergency broadcasting control unit 16 is arranged by a microphone terminal 17 provided in a control room of the airport and a voice input apparatus 18 functioning as a means for sending an emergency voice signal. The microphone terminal 17 is used to input the emergency voice signal and an emergency broadcasting command (terminal group number of tuner terminal 37 at transmitter end, and picture channel information to be broadcasted) in case of emergency. The voice input apparatus 18 is employed to transmit the emergency voice signal and the emergency broadcasting command in a separation form. The FM modulator 19 is provided between the head end 35 and the emergency broadcasting control unit 16, and frequency-modulates the emergency voice signal entered from the voice input apparatus 18.

The data gateway 20 corresponds to a data managing apparatus for editing various input information. This data gateway 20 is constructed of a voice command input/output apparatus 21, a voice control command converting apparatus 22, first to third text data receiving apparatuses $23_1$ to $23_3$, first to third text data/character code converting apparatuses $24_1$ to $24_3$, an attribute information converting apparatus 25, an image data receiving apparatus 26, an image data compressing apparatus 27, and an information transferring apparatus 28.

The voice command input/output apparatus 21 has a counter (not shown) for counting a waiting time defined by a time period when the tuner terminal 37 can receive. Upon receipt of the terminal group number of the tuner terminal 37 at the transmission destination from the voice input apparatus 18 of the emergency broad-casting control unit 16, the voice command input/output apparatus 21 commences its counting operation, and sends out a voice input permission signal via the voice input apparatus 18 to the microphone terminal 17 after the counting operation is completed. The voice control command converting apparatus 22 corresponds to a selection means for selecting a tuner terminal ID number corresponding to the terminal group number entered from the voice command input/output apparatus 21.

The first to third text data receiving apparatuses $23_1$ to $23_3$ receive via two modems 12 the text data which are constructed of character codes and are sent from the first to third host computers $10_1$ to $10_3$, respectively. Based upon the text data received by the first to third text data receiving apparatuses $23_1$ to $23_3$, the first to third text data/character code converting apparatuses $24_1$ to $24_3$ acquire the text data from the first to third text data receiving apparatuses $23_1$ to $23_3$ and convert the text data to character codes. The attribute information converting apparatus 25 acquires the character codes of the text data from the first to third text data/character code converting apparatuses $24_1$ to $24_3$ and adds the character/color information to the character codes to covert the text data into color text data.

The image data receiving apparatus 26 receives the image data from the video data control unit 15. The image data compressing apparatus 27 compresses the image data received by the image data receiving apparatus 26 by way of the run-length method to be converted into compressed image data. The information transmitting apparatus 28 transmits the tuner terminal ID number entered from the voice control command converting apparatus 22, the color text data inputted from the attribute information converting apparatus 25, and the compressed image data inputted from the image data compressing apparatus 27 to the communication control unit 32. It should be noted that the tuner terminal ID number, color text data, and compressed image data are collectively referred to as "editing information".

The communication control unit 32 is constructed of a computer and a serial controller. This communication control unit 32 makes a decision on priority orders (discussed hereinbelow), makes up HDLC (High level Data Link Control Procedure) frame data (described hereinbelow), and thereafter converts the editing information entered from the information transmitting apparatus 28 into a transmission signal of 2.04 Mbps. The QPSK modulator 33 quadrature-phase-shift-modulates the transmission signal derived from the communication control unit 32 to be converted into a QPSK modulation signal.

The head end 35 mixes television signals inputted from a plurality of monitor cameras 14, the emergency voice signal inputted from the FM modulator 19, and the QPSK modulation signal inputted from the QPSK modulator 33, and then supplies the mixed signal via the coaxial cable 36 to the respective tuner terminals 37.

Figure 2:
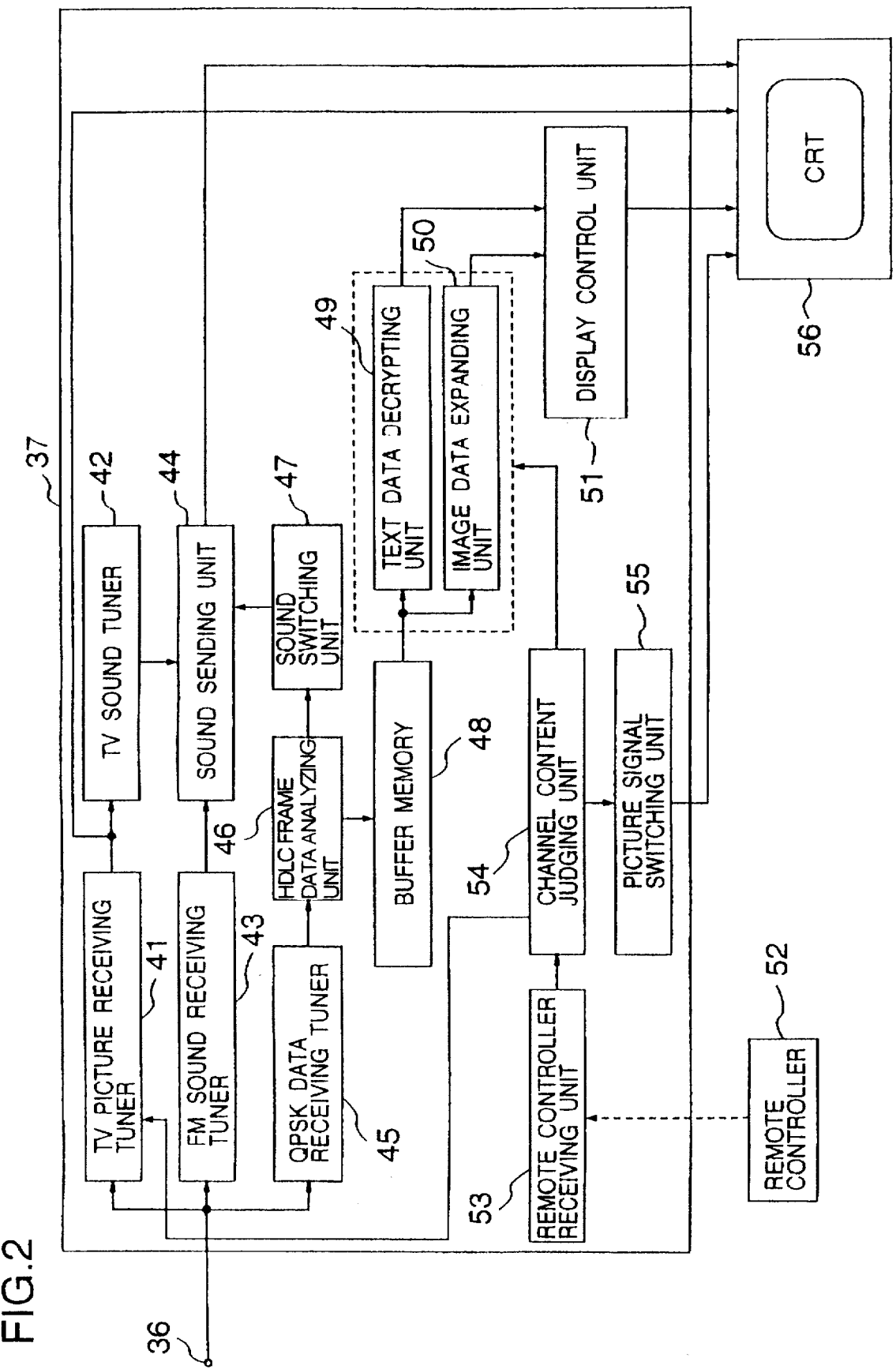
FIG. 2 schematically indicates a tuner terminal shown in FIG. 1.

As represented in FIG. 2, the tuner terminal 37 is arranged by a television picture receiving tuner (TV picture receiving tuner) 41, a television sound tuner (TV sound tuner) 42, a frequency-modulated sound receiving tuner (FM sound receiving tuner) 43, a sound sending unit 44, and a quadrature-phase-shift-modulated data receiving tuner (QPSK data receiving tuner) 45. The tuner terminal 37 is further arranged by a decrypting HDLC frame data analyzing unit 46, a sound switching unit 47, a buffer memory 48, a text data decrypting unit 49, an image data expanding unit 50, a display control unit 51, a remote controller receiving unit 53, a channel content judging unit 54, and a picture signal switching unit 55.

The TV picture receiving tuner 41 receives the television signal inputted from the head end 35 via the coaxial cable 36 and derived from the monitor camera 14. The TV sound tuner 42 extracts the television sound signal contained in the television signal received by the TV picture receiving tuner 41. The FM sound receiving tuner 43 receives the emergency voice signal derived from the FM modulator 19 entered from the head end 35 via the coaxial cable 36. The sound sending unit 44 outputs one of the television sound signal inputted from the TV sound tuner 42 and the emergency voice sound signal inputted from the FM sound receiving tuner 43.

The QPSK data receiving tuner 45 demodulates the QPSK modulation signal derived from the QPSK modulator 33, entered from the head end 35 via the coaxial cable 36, thereby obtaining the HDLC frame data. The HDLC frames data analyzing unit 46 analyzing the HDLC frame data entered from the QPSK data receiving tuner 45 to convert to HDLC frame data into as the compressed image data, the color text data, and the emergency broadcasting command.

The sound switching unit 47 controls the switching operations in the sound sending unit 44, namely the sound switching unit 47 is controlled such that when the tuner terminal ID number contained in the emergency broadcasting command inputted from the QPSK data receiving tuner 45 is coincident with the ID number of its own tuner terminal 37, the emergency voice signal derived from the FM sound receiving tuner 43 is outputted therefrom. The buffer memory 48 stores therein the compressed image data, the color text data and the emergency broadcasting command all of which are inputted from the HDLC frame data decrypting unit 46.

The text data decrypting unit 49 recognizes a channel demand for the text data to read the color text data from the buffer memory 48, and decrypts the character code and the character color information from this color text data. The image data expanding unit 50 recognizes a channel demand for the image data to read the compressed image data from the buffer memory 48, and expands this image data so as to be separated into the 16-color pallet data and the 4 plain data of 640×400 dots. The display control unit 51 produces three primary color TV signals (red signal, green signal, and blue signal) and sync (synchronization) signals based on the pallet data and the plain data both of which are inputted from the image data expanding unit 50.

The remote controller receiving unit 53 receives a channel number signal transmitted from a remote controller 52 equipped with channel selection buttons of the tuner terminal 37. The channel content judging unit 54 corresponds to a comparing/judging means of the channel number, and compares the channel number entered from the remote controller receiving unit 53 with a previously registered channel content. When the channel number entered from the remote controller receiving unit 53 corresponds to a channel number for the monitor camera picture, the channel content judging unit 54 tunes the reception frequency of the TV picture receiving tuner 41 to the relevant channel. On the other hand, when the channel numbers entered from the remote controller receiving unit 53 correspond to the channel numbers for the text data and the image data, the channel content judging unit 54 controls the text data decrypting unit 49 and the image data expanding unit 50 so as to cause the display control unit 51 to output the pallet data and the plain data.

In case that the channel content judging unit 54 judges that the channel number inputted from the remote controller receiving unit 53 corresponds to the channel number for the monitor camera picture, the picture signal switching unit 55 causes the display unit 56 to receive the television signal (NTSC signal) derived from the TV picture receiving tuner 41. On the other hand, when the channel content judging unit 54 judges that the channel number inputted from the remote controller receiving unit 53 corresponds to the channel number for the text data and the image data, this picture signal switching unit 55 causes to receive the three primary color signals and the sync signals from the display control unit 51.

The display unit 56 outputs sounds in response to the sound signal inputted from the sound sending unit 44, and also displays the picture in response to the television signal derived from the TV picture receiving tunner 41 or the three primary color signals and the sync signals derived from the display control unit 51.

Figure 3:
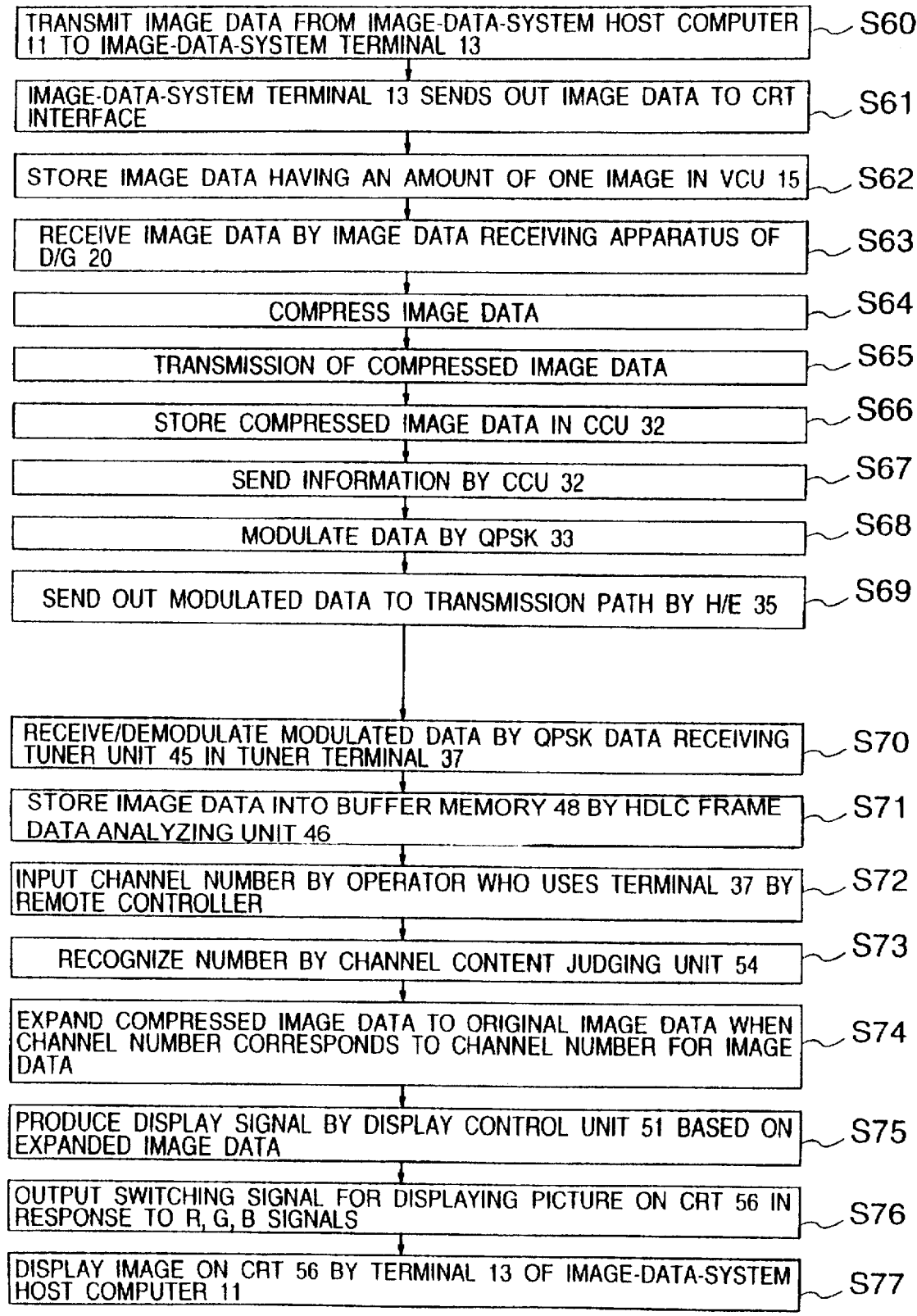
FIG. 3 is a flow chart for explaining image data of the CATV system according to the first embodiment of the present invention.

Referring now to FIG. 3, a flow of the image data from the image-data-system host computer 11 to the display unit 56 in the CATV system according to this first embodiment will be described.

The image data such as a weather map outputted from the image-data-system host computer 11 is transmitted via two modems 12 to the image-data-system terminal 13 (step S60), and thereafter is sent to the CRT interface employed in the image-data-system terminal 13 (step S61). Subsequently, the image data is transmitted from the CRT interface to the video data control unit (VCU) 15, so that one screen image of the image data is stored (step S62). The image data having one screen image is resolved into 16 sorts of pallet data and plain data constructed of 640 dots×480 lines×4 bits in the video data control unit 15. The plain data constructed of 640 dots×480 lines×4 bits is processed by the video data control unit 15 in such a manner that 80 lines of this plain data containing a less information value is deleted therefrom, and then this plain data is fitted to a new size of 640 dots×400 lines equal to the display size on the display unit 56.

The image data (pallet data and plain data) transmitted from the video data control unit 15 is received by the image data receiving apparatus 26 of the data gateway (D/G) 20 (step S63), and thereafter is compressed in accordance with the run length method by the image data compressing apparatus 27, thereby being converted into the compressed image data (step S64). After the compressed image data has been transmitted from the information transmitting apparatus 28 to the communication control unit (CCU) 32 (step S65), this compressed image data is stored into a buffer memory built in the communication control unit 32 (step S66). It should be understood that the communication control unit 32 determines priority orders with respect to various sorts of data stored in the built-in type buffer memory based on the following priority orders of data outputs:

1. Emergency broadcasting command.
2. Text data, or image data.

When the priority orders have been determined, the compressed image data stored in the built-in type buffer memory is used to constitute the HDLC frame data, and thereafter this HDLC frame data is transmitted at a speed of 2.04 Mbps to the QPSK modulator 33 in the communication control unit 32 (step S67). In the QPSK modulator 33, after the HDLC frame data has been quadrature-phase-shift-modulated to be converted into the QPSK modulation signal (step S68), this QPSK modulation signal is transmitted as a modulation signal of 416.8 MHz from the QPSK modulator 33 to the head end 35. The modulation signal of 416.8 MHz is sent from the head end (H/E) 35 to the coaxial cable 36 (step S69).

In the QPSK data receiving tuner 45 within the tuner terminal 37, the above-explained modulation signal is received and thereafter demodulated, thereby being converted into the HDLC frame data (step S70). The HDLC frame data is analyzed by the HDLC frame data analyzing unit 46 to obtain the compressed image data. The compressed image data is stored in the buffer memory 48 (step S71).

When an operator of the tuner terminal 37 (worker to operate tuner terminal 37) selects the channel number for the image data by using the remote controller 52 (step S72), a channel number selection signal indicative of the selected channel number is transmitted from the remote controller 52 to the tuner terminal 37, and then is received by the remote controller receiving unit 53. After the received channel number selection signal is sent to the channel content judging unit 54, the channel number indicated by the channel number selection signal is compared with the content of the previously registered channel number (step S73). As a result of this comparison, when it is so judged that the channel number indicated by the channel number selection signal corresponds to the channel number for the image data, the compressed image data stored in the buffer memory 48 is read into the image data expanding unit 50, and thereafter this compressed image data is expanded to the image data before compression (16 sorts of pallet data and plain data of 640 dots×400 lines×4 bits) (step S74). In the display control unit 51, the display signals (namely, three primary color signals R, G, B and sync signals) are formed based on the expanded image data (step S75). Also, switching signals for displaying an image in response to the three primary color signals are outputted from the picture signal switching unit 55 to the display unit 56 (step S76). As a consequence, a color image is displayed on the display unit 56 in accordance with the image displayed on the image-data-system terminal 13 connected to the image-data-system host computer 11 (step S77).

Figure 4:
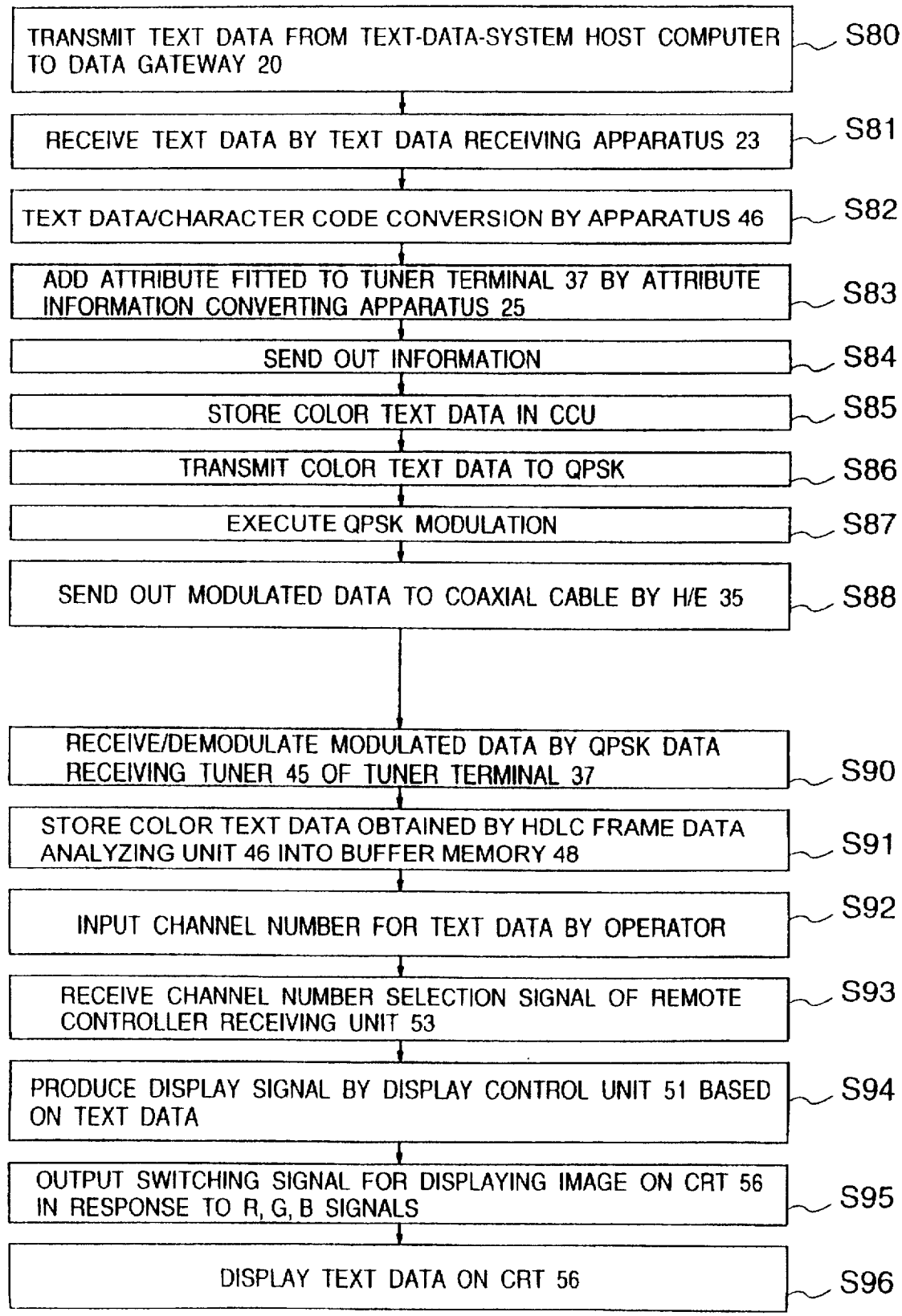
FIG. 4 is a flow chart for explaining text data of the CATV system according to the first embodiment of the present invention.

Next, with reference to FIG. 4, a description will now be made of a flow of the text data from the text-data-system host computer 10 to the display unit 56 in the CATV system according to this embodiment.

For instance, the text data formed in the first host computer $10_1$ of the text-data-system host computer 10 is transmitted via two modems 12 to the data gateway 20 (step S80), and then is received by the first text data receiving apparatus $23_1$ (step S81). Thereafter, the text data is sent to the first text data/character code converting apparatus $24_1$ in which the text data is converted to character codes (step S82). In the attribute information converting apparatus 25, since the character/color information (attribute fitted to tuner terminal 37) is added to the text data inputted from the first text data/character code apparatus $24_1$, the text data is converted into color text data (step S83). The color text data is transmitted via the information transmitting apparatus 28 to the communication control unit 32 (step S84) and then is stored into a memory buffer built in the communication control unit 32 (step S85).

In the communication control unit 32, the data transmission priority orders for the stored color text data are determined. It should be noted that this priority order decision is carried out in a similar manner to that of the above-explained image data flow operation. Thereafter, the color text data is used to constitute the HDLC frame data, and then this HDLC frame data is transmitted at a speed of 2.04 Mbps from the communication control unit 32 to the QPSK modulator 33 (step S86). In the QPSK modulator 33, after the HDLC frame data has been quadrature-phase-shift-modulated to be converted into the QPSK modulation signal (step S87), this QPSK modulation signal is transmitted as a modulation signal of 416.8 MHz from the QPSK modulator 33 to the head end 35. The modulation signal of 416.8 MHz is sent from the head end (H/E) 35 to the coaxial cable 36 (step S88).

In the QPSK data receiving tuner 45 within the tuner terminal 37, the above-explained modulation signal is received and thereafter demodulated, thereby being converted into the HDLC frame data (step S90). The HDLC frame data is analyzed by the HDLC frame data analyzing unit 46 to obtain the color text data. The color text data is stored in the buffer memory 48 (step S91).

When an operator of the tuner terminal 37 selects the channel number for the text data by using the remote controller 52 (step S92), a channel number selection signal indicative of the selected channel number is transmitted from the remote controller 52 to the tuner terminal 37, and then is received by the remote controller receiving unit 53 (step S93). After the received channel number selection signal is sent to the channel content judging unit 54, the channel number indicated by the channel number selection signal is compared with the content of the previously registered channel number. As a result of this comparison, when it is so judged that the channel number indicated by the channel number selection signal corresponds to the channel number for the text data, the color text data stored in the buffer memory 48 is read in the text data decrypting unit 49, and thereafter both the character code and the character/color information are decrypted. In the display control unit 51, the display signals (three primary color signals R, G, B and sync signals) are produced based on such decrypted color text data sent from the text data decrypting unit 49 (step S94), and thereafter are outputted to the display unit 56. Also, switching signals for displaying images in response to the three primary color signals are outputted from the picture signal switching unit 55 to the display unit 56 (step S95). As a consequence, a color text image is displayed on the display unit 56 in accordance with the text image displayed by the first host computer $10_1$ (step S96).

Figure 5:
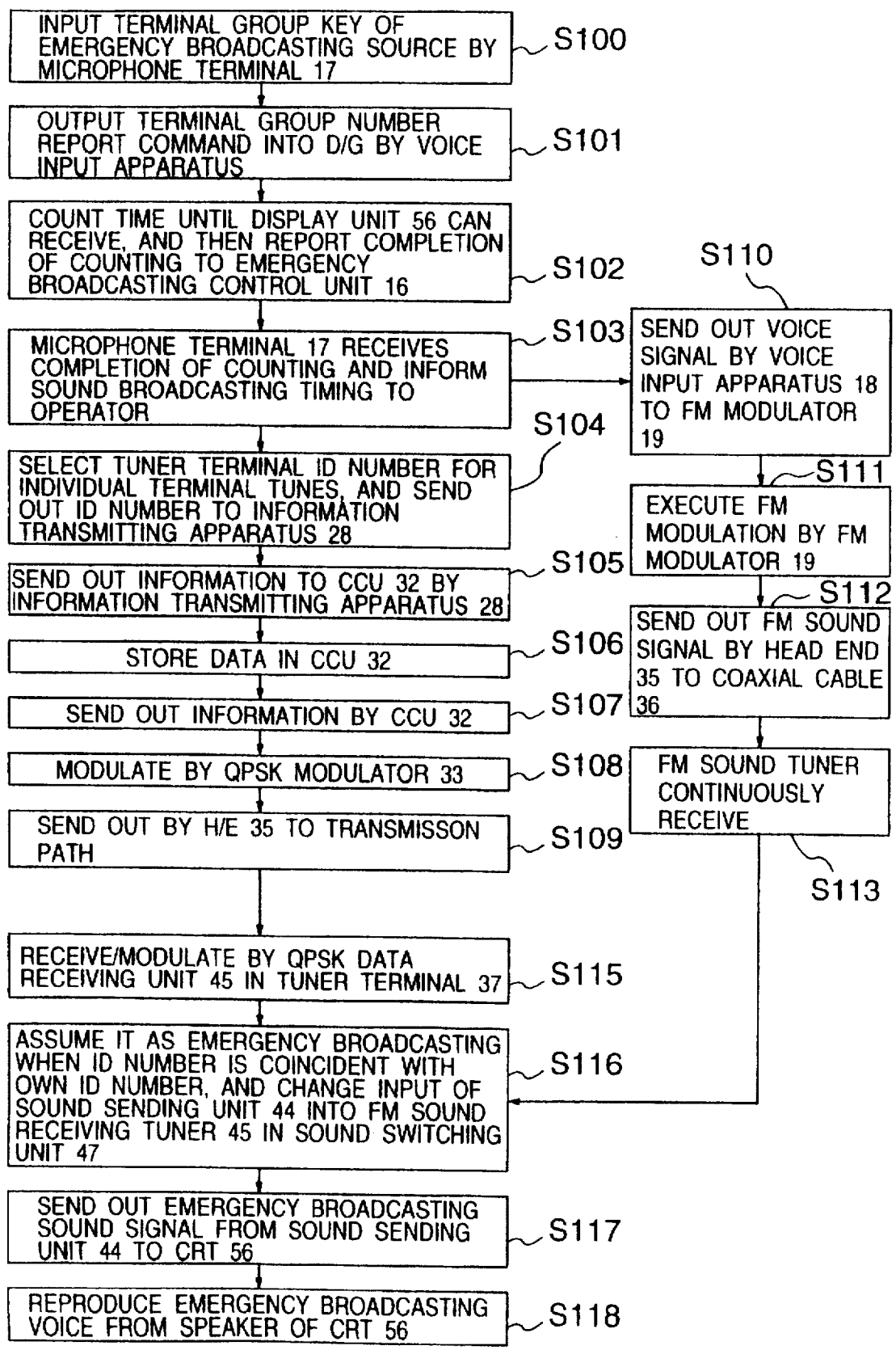
FIG. 5 is a flow chart for explaining emergency broadcasting of the CATV system according to the first embodiment of the present invention.

Thereafter, a flow of the emergency broadcasting information from the microphone terminal 17 to the display unit 56 in the CATV system according to this embodiment will now be explained with reference to FIG. 5.

During the emergency broadcasting operation, when an operator of the microphone terminal 17 depresses a terminal group key indicative of a group to which the display unit 56 belongs by which the emergency broadcasting information should be sent, among a plurality of terminal group keys provided on the microphone terminal 17 (step S100), a terminal group number representative of the selected terminal group is outputted from the microphone terminal 17 via the voice input apparatus 18 to the data gateway 20 (step S101).

In the voice control command input/output apparatus 21 employed in the data gateway 20, when the terminal group number is received, the counting operation is commenced.

At this time, the count time corresponds to time until the emergency broadcasting operation is done at the display unit 56. When the counting operation in the voice control command input/output apparatus 21 is completed, a voice input permission signal is sent from the voice control command input/output apparatus 21 via the voice input apparatus 18 to the microphone terminal 17. It should be noted that even when another terminal group number is sent while the counting operation is carried out by the voice control command input/output apparatus 21, the counting operation presently performed is continued until the counting end. Then, after the voice input permission signal has been sent out, the counting operation for another terminal group number is commenced (step S102). When the voice input permission signal is sent to the microphone terminal 17, a chime sound is made so as to request the operator to input his voice. As a result, the operator inputs his emergency broadcasting voice to the microphone terminal (step S103).

In the voice control command converting apparatus 22 employed in the data gateway 20, upon receipt of the terminal group number from the voice control command input/output apparatus 21, a selection is made of a tuner terminal ID number corresponding to the received terminal group number from the previously registered tuner ID numbers (step S104), and then the selected tuner terminal ID number is outputted as an emergency broadcasting command from the information transmitting apparatus 28 to the communication control unit 32 (step S105). After the emergency broadcasting command is stored in the buffer memory built in the communication control unit 32 (step S106), this emergency broadcasting command is outputted to the QPSK modulator 33 at top priority (step S107). Similar to the above-described compressed image data and color text data, the emergency broadcasting command is quadrature-phase-shift-modulated by the QPSK modulator 33 to be converted into a QPSK modulation signal (step S108). The QPSK modulation signal is sent to the head end 35, and thereafter is sent out to the coaxial cable 36 (step S109). Since the QPSK data receiving tuner 45 employed in the respective tuner terminals 37 is continuously brought into an ON-state, the QPSK modulation signal is received and demodulated by the QPSK data receiving tuners 45 of all the tuner terminals 37 connected via the coaxial cable 36 to the head end 35 (step S115). As a consequence, the QPSK modulation signal is converted into the HDLC frame data. The HDLC frame data is accepted as the emergency broadcasting command by the HDLC frame data analyzing unit 46. The HDLC frame data analyzing unit 46 compares the tuner terminal ID number indicated by the emergency broadcasting command with its own tuner terminal ID number, and connects both of the sound sending unit 44 and the FM sound receiving tuner 43 to the sound switching unit 47 (step S116).

When in conjunction with the above-described operation, the operator enters his voice communication about the emergency broadcasting into the microphone terminal 17 at the step S103, an emergency voice signal corresponding to the inputted voice communication is outputted via the voice input apparatus 18 to the FM modulator 19 (step S110). The emergency voice signal is frequency-modulated in the FM modulator 19 to be converted into an FM sound signal (step S111). The FM sound signal is transmitted to the head end 35, and thereafter sent out to the coaxial cable 36 (step S112). Since the FM sound receiving tuners 43 employed in the respective tuner terminals 37 are continuously under ON-states, this FM sound signal is received to be demodulated by the FM sound receiving tuners 43 employed in all of the tuner terminals 37 connected via the coaxial cable 36 to the head end 35 (step S113). As a result, the FM sound signal is converted into the emergency voice signal.

At this time, since the sound sending unit 44 is connected to the FM sound receiving tuner 43 at the step S116, the emergency sound signal is outputted via the sound sending unit 44 to the display unit 56 (step S117). As a result, communication voice of the emergency broadcasting is outputted from a speaker built in the display unit 56 (step S118).

It should be noted that when the channel selection command is sent to the tuner terminal 37 in combination with the emergency broadcasting command, not only voice communication of the emergency broadcasting but also the picture information may be transmitted.

Figure 6:
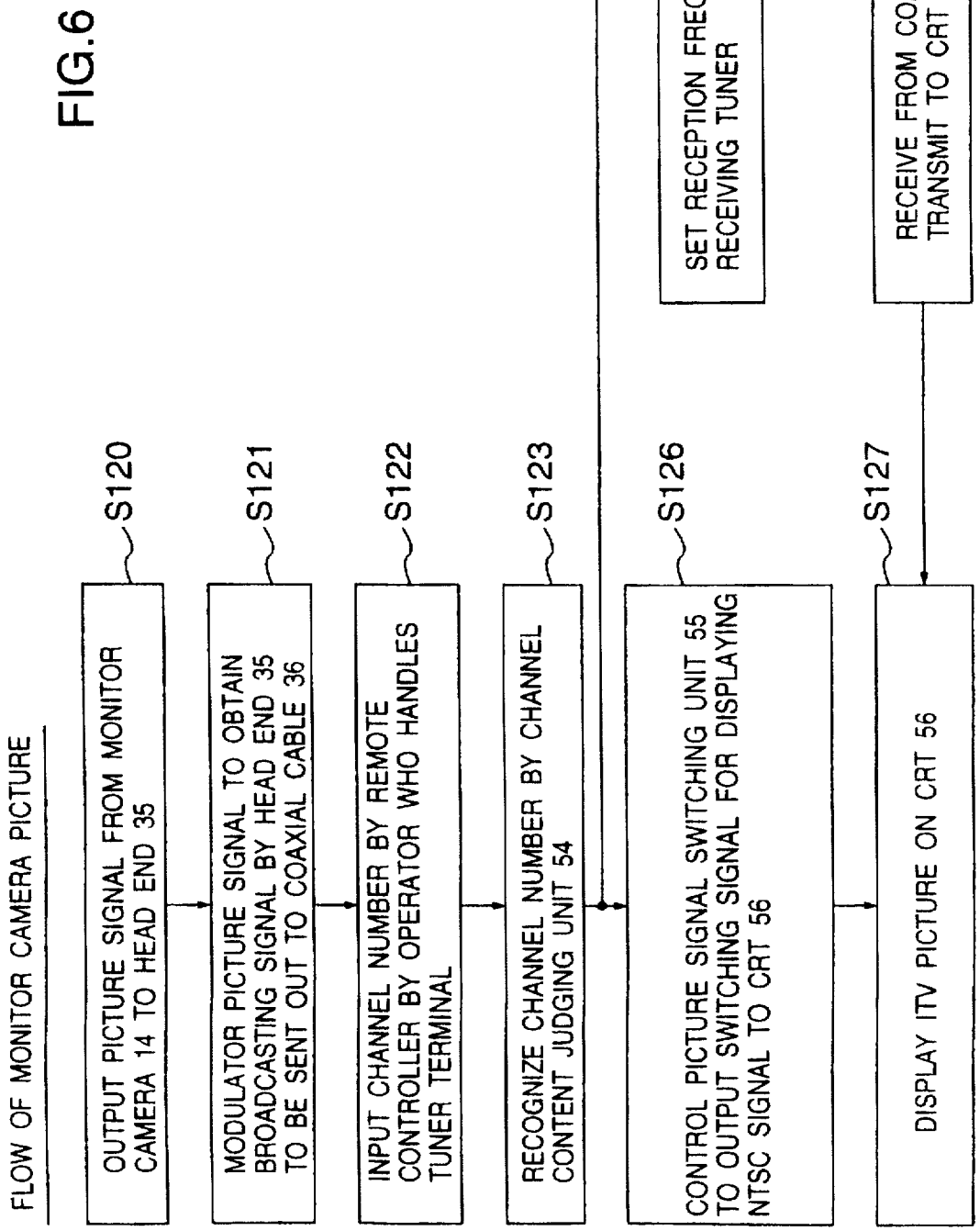
FIG. 6 is a flow chart for explaining pictures of a monitor camera employed in the CATV system according to the first embodiment of the present invention.

Referring now to FIG. 6, a flow of the NTSC picture signal from the monitor camera 14 to the display unit 56 in the CATV system according to this first embodiment will be described.

After a picture imaged by the monitor camera 14 has been converted into an NTSC picture signal, this NTSC picture signal is sent to the head end 35 (step S120). In the head end 35, the NTSC picture signal is modulated to produce a broadcasting signal which will then be sent out to the coaxial cable 36 (step S121).

When the operator of the tuner terminal 37 enters a channel number for the monitor camera picture into the remote controller 52 (step S122), a channel number signal indicative of the inputted channel number is transmitted from the remote controller 52 to the tuner terminal 37, and then is received by the remote controller receiving unit 53. After the received channel number signal is sent to the channel content judging unit 54, the channel number indicated by the channel number signal is compared with the content of the previously registered channel number. As a result of this comparison, when it is so recognized that the channel number indicated by the channel number signal corresponds to the channel number for the monitor camera picture (step S123), such a frequency setting signal for setting the reception frequency of the TV picture receiving tuner 41 to a frequency corresponding to the channel number for the monitor camera picture is outputted from the channel content judging unit 54 to the TV picture receiving tuner 41 (step S124). As a consequence, the broadcasting signal sent to the coaxial cable 36 is received and demodulated by the TV picture receiving tuner 41, so that this broadcasting signal is converted into an NTSC picture signal which will then be transmitted to the display unit 56 (step S125). When in connection with the above-described operation, it is so recognized at the step S123 that the channel number indicative of the channel number signal corresponds to the channel number of the monitor camera picture, the channel content judging unit 54 controls the picture signal switching unit 55 to output such a switching signal for displaying a picture in response to the NTSC picture signal into the display unit 56 (step S126). Accordingly, the picture imaged by the monitor camera is displayed on the display unit 56 (step S127).

As previously described in detail, in the CATV system according to this embodiment, a host computer whose protocol is not disclosed is selected to be the host computer for transmitting not the text data, but the image data. As a consequence, this host computer can be combined with other host computers whose protocols are disclosed in this CATV system. As a result, the shape of the finally produced image can be directly transmitted without paying any attention to the production stages (decryption, edition and so on) of the image.

(Second Embodiment)

Figure 7:
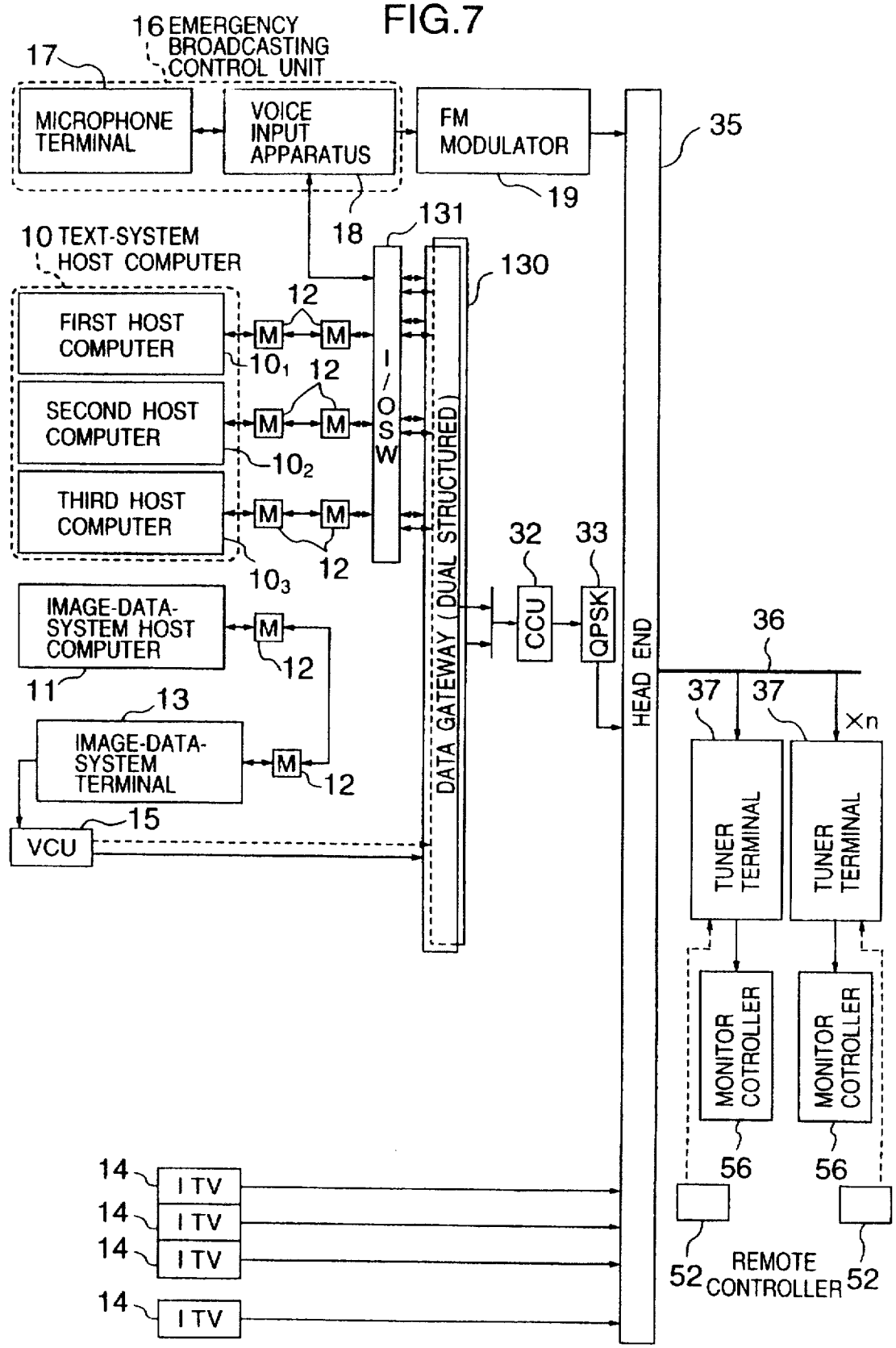
FIG. 7 schematically indicates an arrangement of a CATV system according to a second embodiment of the present invention.

A CATV system according to a second embodiment has a different point from that of the CATV system of the first embodiment such that a data gateway is made of a dual structure so as to improve reliability of this CATV system. That is, in the CATV system of this second embodiment, as represented in FIG. 7, a data gateway 130 constructed of minicomputers owns a dual structure such as an operation system and a waiting system. An input/output switcher (I/O SW) 131 functioning as a switching means for the data gateway 130 is provided between each of three modems 12 on the side of the data gateway 130 and the data gateway 130, and between a voice input apparatus 18 and the data gateway 130. These modems 12 and voice input apparatus 18 are provided between the text-system host computer 10 and the data gateway 130. The input/output switcher 131 switches the data output from the text-system host computer 10 and the voice input apparatus 18 to the data gateway 130. The data gateway 130 is connected to the communication control unit 32 via a LAN (Local Area Network) of the transmission control protocol/internet (TCP•IP) procedure. Further, a video control unit 15 outputs image data to each of the operation system and waiting system of the data gateway 130.

Operations of the CATV system according to this second embodiment will now be explained. Normally, the data gateway 130 functions as the operation system. The operation system mutually monitors a state monitor signal together with the waiting system. The data gateway 130 is changed from the operation system to the waiting system in the following cases. That is, with respect to failure occurrences about the hardware/software of the operation system, the waiting system which newly becomes the operation system causes the input/output switcher 131 to be changed from the former operation system into the latter operation system in the following two cases:

1) The operation system itself detects an error, and then sends a switching signal to the waiting system.

2) If the operation system itself cannot detect an error, then the waiting system confirms the state monitor signal of the operation system and detects the error.

The former operation system in which the failure happens to occur is cut out from the CATV system according to this embodiment, since the input/output switcher 131 is switched. The latter operation system instructs to the communication control unit 32 that the next communication end is the latter operation system.

As described above, since the data gateway is made of the dual structure in the CATV system according to the second embodiment, even when either the operation system or the waiting system of the data gateway 130 malfunctions, the functions of the CATV system according to the first embodiment can be maintained.

(Third Embodiment)

Figure 8:
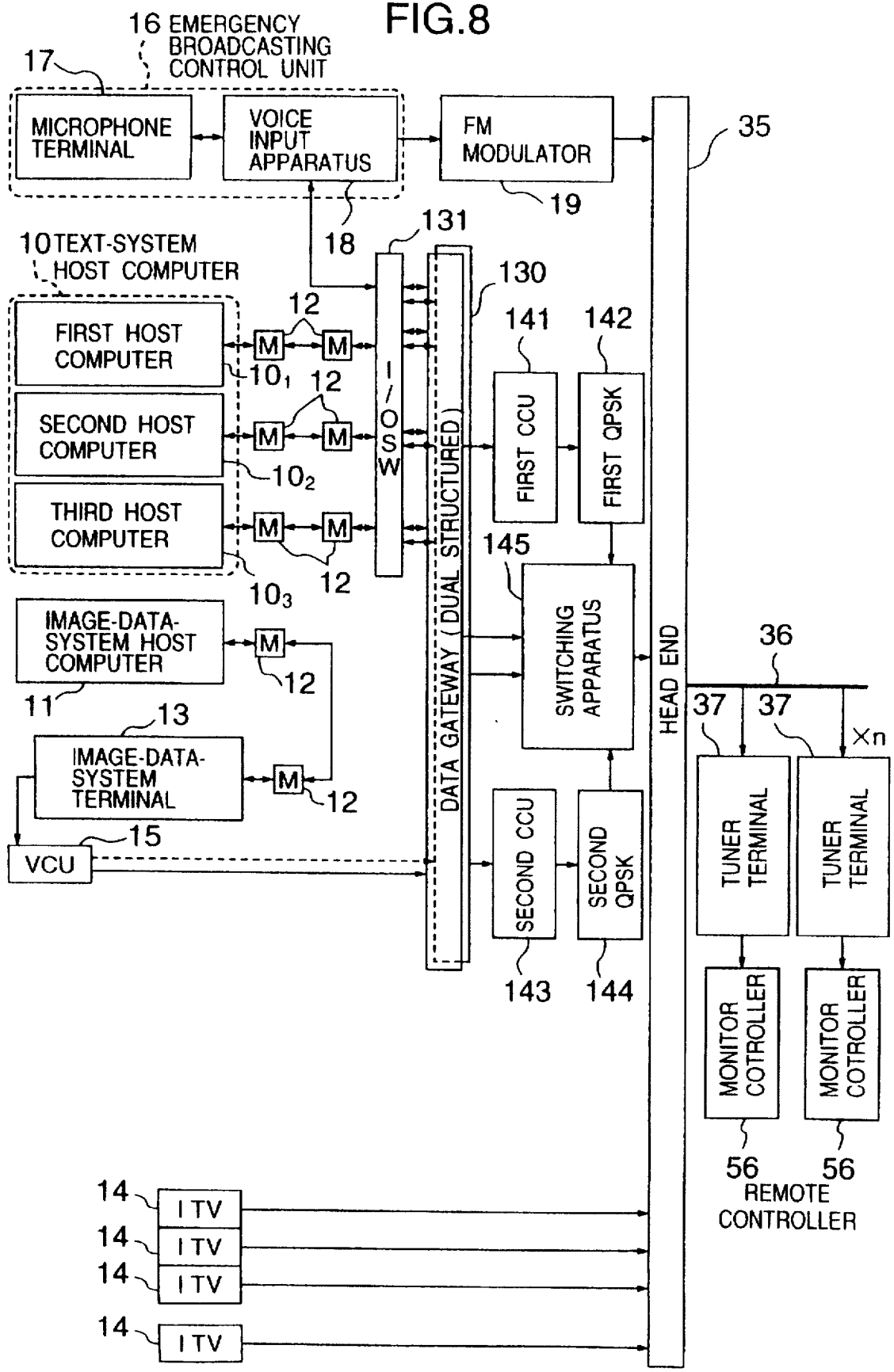
FIG. 8 schematically indicates an arrangement of a CATV system according to a third embodiment of the present invention.

A CATV system according to a third embodiment has a different point from that of the CATV system according to the second embodiment, such that to further increase reliability of this CATV system according to the third embodiment, both of the communication control unit (CCU) and the quadrature phase shift keying modulator (QPSK modulator) are made of dual structures, and an interface between the data gateway and the communication control unit is made of a parallel interface. In other words, the CATV system according to the third embodiment is different from the CATV system according to the second embodiment, because this third CATV system includes, as illustrated in FIG. 8, a first communication control unit 141 corresponding to a communication control means for the operation system of the data gateway 130; a second communication control unit 143 corresponding to a communication control means for the waiting system of the data gateway 130, a first quadrature phase shift keying modulator (first QPSK modulator) 142 for QPSK-modulating a digital signal outputted from the first communication control unit 141; and a second quadrature phase shift keying modulator (second QPSK modulator) 144 for QPSK-modulating a digital signal outputted from the second communication control unit 143, and further a switching apparatus 145 for selecting one of the QPSK modulation signal derived from the first QPSK modulator 142 and the QPSK modulation signal derived from the second QPSK modulator 144 in response to a switching request signal issued from the data gateway 130, and then outputs the selected QPSK modulation signal to a head end 35.

Next, operations of the CATV system according to this third embodiment will now be explained. A system which newly becomes the operation system among the data gateway 130 outputs a switching request signal (pulse signal) to the switching apparatus 145, and also outputs data via the first communication control unit 141 and the first QPSK modulator 142 to the switching apparatus 145. The switching apparatus 145 selects the QPSK modulation signal outputted from the first QPSK modulator 142 in response to the switching request signal, and outputs this QPSK modulation signal to the head end 35.

As described above, since the data gateway, the communication control unit and the QPSK modulator are made of the dual structures in the CATV system of this third embodiment, the functions of the CATV system according to the first embodiment can be maintained even when a malfunction happens to occur in any one of two connection systems. One of the connection systems comprises the operation system of the data gateway 130, the first communication control unit 141 and the first QPSK modulator 142, and the other comprises the waiting system of the data gateway 130, the second communication control unit 143 and the second QPSK modulator 144.

(Fourth Embodiment)

A CATV system according to a fourth embodiment has a different point from that of the CATV system according to the third embodiment. That is, to further increase reliability of this CATV system according to the fourth embodiment, an interface between a data gateway and a communication control unit is a LAN of the transmission control protocol/internet procedure. That is, the CATV system of this fourth embodiment differs from the CATV system of the third embodiment that both of the first communication control unit 141 and the second communication control unit 143 function as communication control means for both of the operation system and the waiting system of the data gateway 130.

Figure 9:
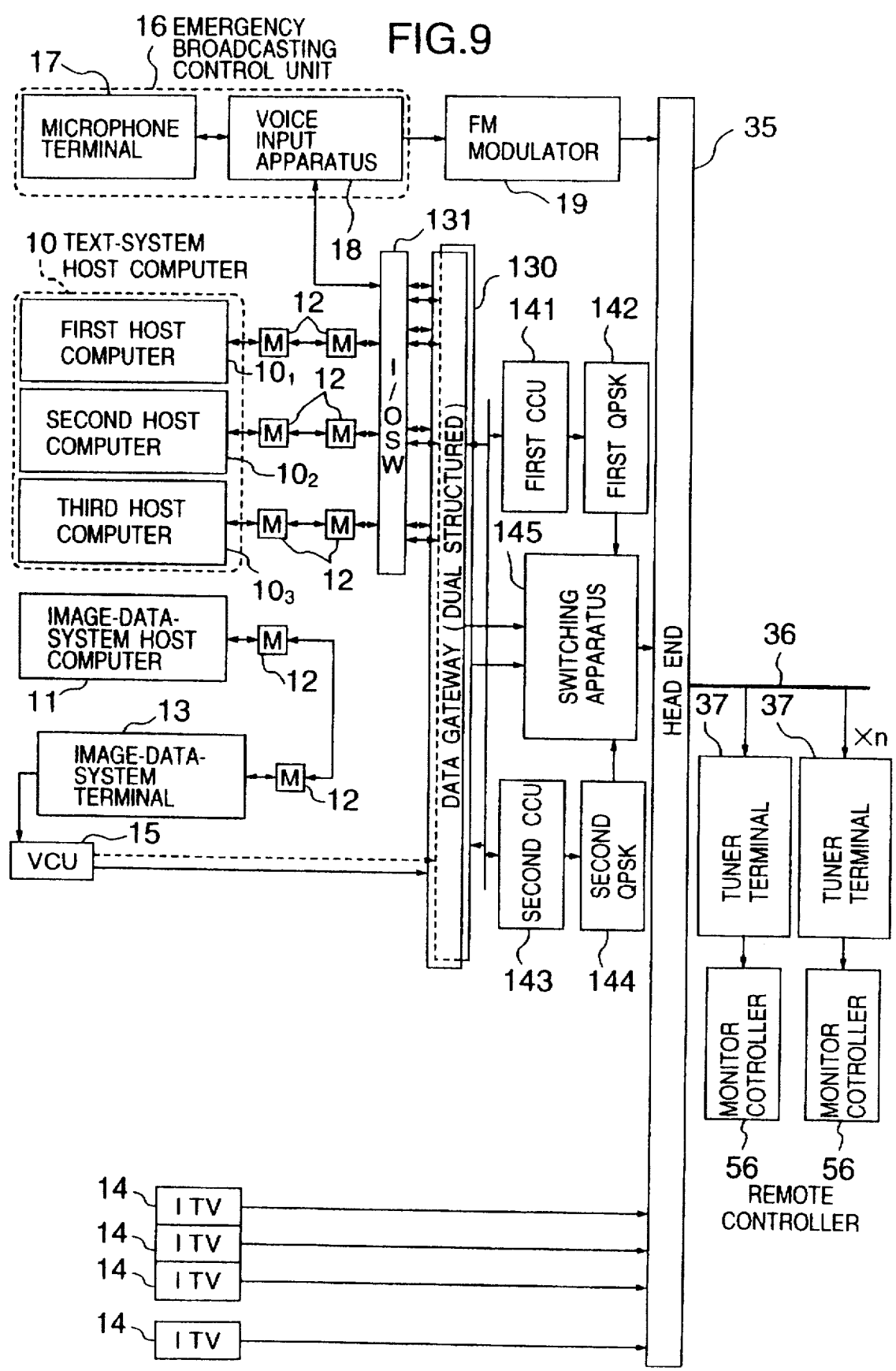
FIG. 9 schematically shows an arrangement of a CATV system including LAN of TCP•IP, according to a fourth embodiment of the present invention.

Referring now to FIG. 9, operations of the CATV system according to the fourth embodiment will be explained. When a failure happens to occur in the operation system of the data gateway 130, the waiting system of the data gateway 130 becomes a new operation system thereof. The new operation system of the data gateway 130 sends via the LAN of the transmission control protocol/internet procedure to the first communication control unit 141 such a message that a data sender is this new operation system of the data gateway 130 and also a data receiver is the first communication control unit 141. When the first communication control unit 141 which has received this message is under operable condition, the first communication control unit 141 sends an OK-message to the new operation system of the data gateway 130. The new operation system of the gate way 130, which has received this OK-message, transmits data to the first communication control unit 141. At this time, the switching apparatus 145 outputs the QPSK modulation signal outputted from the first QPSK modulator 142 to the head end 35 in a similar manner to that before the failure happens to occur.

On the other hand, when the first communication control unit 141 which has received the message sent from the new operation system of the data gateway 130 is under a not operable condition, this first communication control unit 141 either transmits a failure announcing message, or does not transmit an OK-message to the new operation system of the data gateway 130. In case that the new operation system of the data gateway 130 has received the failure announcing message, or has not received the OK-message, this new operation system sends via the LAN of the transmission control protocol/internet procedure to the second communication control unit 143, such a message that the data sender is this new operation system and also a data receiver is the second communication control unit 143. Thereafter, the new operation system of the data gateway 130 outputs a switching request signal (pulse signal) to the switching apparatus 145, and also transmits data to the second communication control unit 143. The switching apparatus 145 outputs the QPSK modulation signal derived from the second QPSK modulator 144 to the head end 35 in response to the switching request signal.

As described above, since the interface between the dual-structured data gateway 130 and the dual-structured communication control units 141, 143 is realized as the LAN of the transmission control protocol/internet procedure in the CATV system according to this fourth embodiment, the functions of the CATV system according to the first embodiment can be maintained if at least one of the operation system of the data gateway 130 and the waiting system thereof, and also at least one of the two connection systems constructed of the communication control unit and the QPSK modulator are under operable conditions.

Figure 10A:
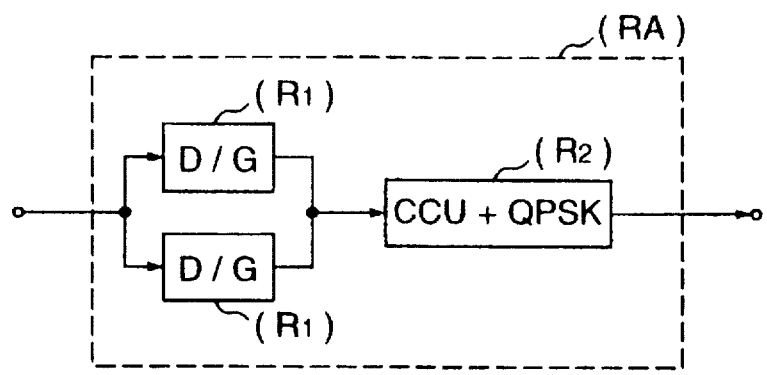
FIG. 10A partially represents a block diagram of the CATV system according to the second embodiment.
Figure 10B:
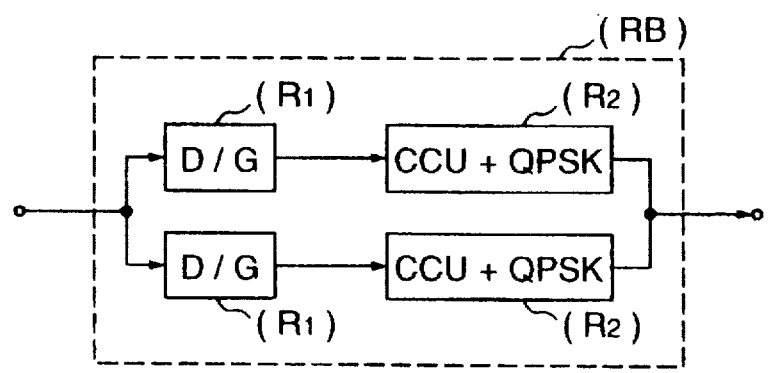
FIG. 10B partially represents a block diagram of the CATV system according to the third embodiment.
Figure 10C:
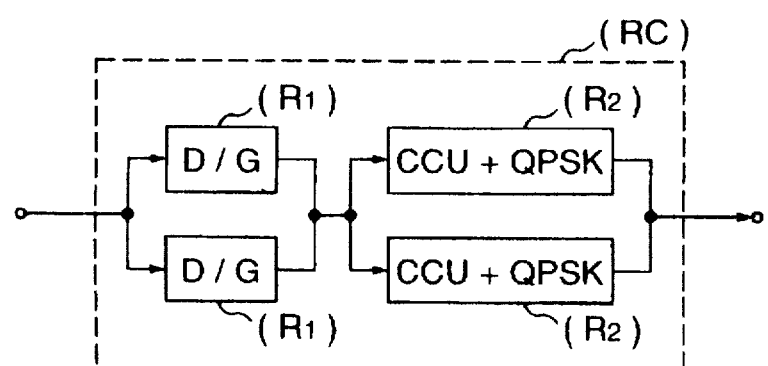
FIG. 10C partially represents a block diagram of the CATV system according to the fourth embodiment.

With reference to FIGS. 10A to 10C, a description will now be made of reliability possessed by the above-explained CATV systems according to the second embodiment through the fourth embodiment. In the following descriptions, it is assumed that reliability of the data gateway is equal to "R1" (0<R1<1), whereas reliability of the connection system constructed of the communication control unit and the QPSK modulator is equal to "R2" (0<R2<1).

As to reliability of the CATV system according to the second embodiment, shown in FIG. 7, a description will now be made with reference to a block diagram of FIG. 10A for representing a simplified block diagram constructed of the dual-structured data gateway 130, the communication control unit (CCU) 32, and the QPSK modulator 33. Reliability of the dual-structured data gateway (D/G) 130 is expressed by formula (1):

$$1-(1-R1)^2 = R1 \cdot (2-R1) \quad (1)$$

Accordingly, reliability "RA" of the overall system of the block diagram shown in FIG. 10A is expressed by the following formula (2):

$$RA = R2 \cdot R1 \cdot (2-R1) \quad (2)$$

Subsequently, reliability of the CATV system shown in FIG. 8, according to the third embodiment, will now be described with reference to FIG. 10B, namely a simplified block diagram constructed of the dual-structured data gateway 130, the first and second communication control units (CCU) 141, 143, and the first and second QPSK modulators 142, 144. Since reliability of a single connection system constructed of the data gateway, the communication control units, and the QPSK modulators is expressed by "1−R1·R2", reliability "RB" of the overall system shown in the block diagram of FIG. 10B is expressed by the following formula (3):

$$\begin{aligned} RB &= 1-(1-R1 \cdot R2)^2 \\ &= R1 \cdot R2 \cdot (2-R1 \cdot R2) \end{aligned} \quad (3)$$

Subsequently, reliability of the CATV system shown in FIG. 9, according to the fourth embodiment, will now be described with reference to FIG. 10C, namely a simplified block diagram constructed of the dual-structured data gateway 130, the first and second communication control units (CCU) 141, 143, and the first and second QPSK modulators 142, 144. Reliability of the dual-structured data gateway (D/G) 130 is expressed by the above-described formula (1). Reliability of the dual-structured communication control units (CCU) and the dual-structured QPSK modulators is expressed by the following formula (4):

$$1-(1-R2)^2 = R2 \cdot (2-R2) \quad (4)$$

As a consequence, reliability "RC" of the overall system shown in the block diagram of FIG. 10C is expressed by the following formula (5):

$$\begin{aligned} RC &= R1 \cdot R2 \cdot (2-R1) \cdot (2-R2) \\ &= R1 \cdot R2 \cdot (4-2 \cdot R1 - 2 \cdot R2 + R1 \cdot R2) \end{aligned} \quad (5)$$

Next, comparing the above-described reliability RA with the above-explained reliability RB, it is obtained from the above-mentioned formulae (2) and (3):

$$\begin{aligned} RB - RA &= R1 \cdot R2 \cdot \{(2-R1 \cdot R2)-(2-R1)\} \\ &= R1^2 \cdot R2 \cdot (1-R2) \\ &> 0 \end{aligned}$$

As a consequence, the reliability RB is larger than the reliability RA.

Comparing the reliability RB with the reliability RC, it is obtained from the above-mentioned formulae (3) and (5):

$$\begin{aligned} RC - RB &= R1 \cdot R2 \cdot \{4-2 \cdot R1 - 2 \cdot R2 + R1 \cdot R2)-(2-R1 \cdot R2)\} \\ &= 2 \cdot R1 \cdot R2 \cdot \{(1-R1) \cdot (1-R2)\} \\ &> 0 \end{aligned}$$

Accordingly, the reliability RC is greater than the reliability RB.

As a result of these comparisons, since the reliability is successively increased in this order of RC, RB, and RA, the CATV system according to the fourth embodiment can have the highest reliability.

(Fifth Embodiment)

A CATV system according to a fifth embodiment has a different point from that of the CATV system according to the fourth embodiment, shown in FIG. 9. That is, a backup terminal unit 150 is employed in this CATV system of the fifth embodiment in order that such information dropped out after an occurrence of the failure can be transmitted even when the failure happens to occur in the text-system host computer 10, the image-data-system host computer 11, or the transmission path from these two host computers to the data gateway 130.

Figure 11:
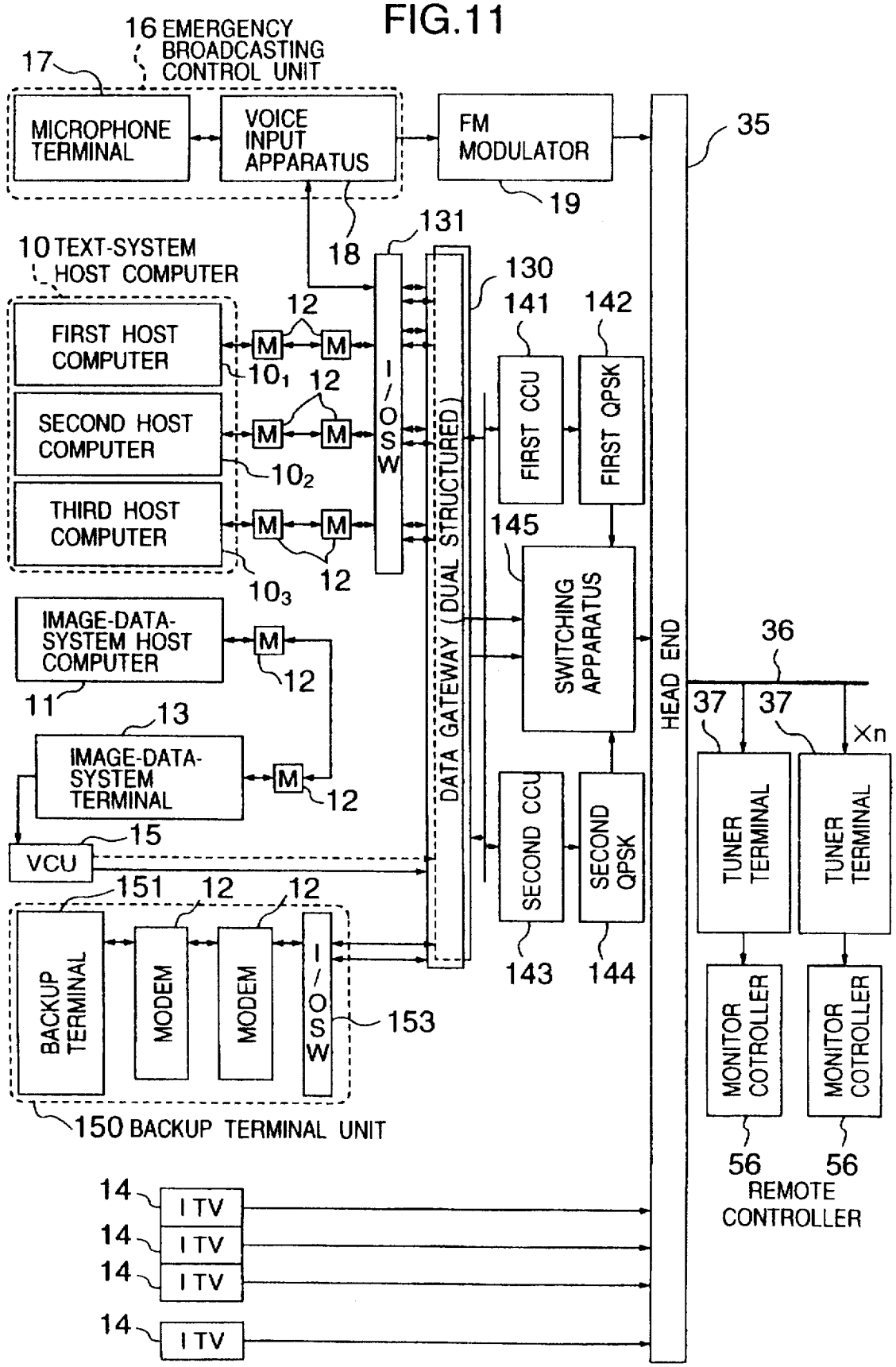
FIG. 11 schematically shows an arrangement of a CATV system according to a fifth embodiment of the present invention.

The backup terminal unit 150 is connected to the data gateway 130, as shown in FIG. 11, and includes a backup terminal 151, an input/output switcher 153, and two modems (modulator/demodulator) 12 provided between the input/output switcher 153 and the backup terminal 151. The backup terminal 151 corresponds to an information input means by which the operator inputs the information when the above-described failure happens to occur. The input/output switcher 153 connects the backup terminal 151 with the data gateway 130 via the two modems 12, and corresponds to a switching means for switching input/output of the data between them.

Next, operations of the CATV system according to this fifth embodiment of the present invention will be described. The backup terminal 151 usually receives the data derived from the text-system host computer and the image-data-system host computer 11 via the data gateway 130, and displays the text and the image represented by this data. When a failure happens to occur in the text-system host computer 10, the image-data-system host computer 11, or the transmission path from these two host computers to the data gateway 130, the operator of the backup terminal 151 transmits to the data gateway 130, such an instruction signal for instructing that a data input source is changed from the lines of the text-system host computer 10 and the image-data-system host computer 11 into the line of the backup terminal 151. Thereafter, the operator inputs current information by employing the backup terminal 151, which should be added to the display screen of the backup terminal 151 before the failure happens to occur. The data gateway 130 receives the data sent from the backup terminal 151 via the input/output switcher 153, and then transmits the data to the tuner terminal 37 via the communication control units 141, 143, the quadrature phase shift keying modulators 142, 144, the head end 35, and the coaxial cable 36.

As a consequence, in the CATV system according to this fifth embodiment, even when the failure happens to occur in the text-system host computer 10, the image-data-system host computer 11, or in the transmission path from these two host computers to the data gateway 130, the information dropped after the occurrence of this failure can be transmitted to the tuner terminal 37.

Thereafter, when the above-described failure is recovered, the operator enters by employing the backup terminal 151 such a message that the failure can be recovered. The backup terminal 151 transmits to the data gateway 130, such an instruction signal for instructing that the data input source is returned to the lines of the text-system host computer 10 and the image-data-system host computer 11. Upon receipt of this instruction signal, the data gateway 130 switches the data input source to the lines of the text-system host computer 10 and the image-data-system host computer 11.

It should be noted that a similar advantage to this CATV system according to the fifth embodiment may be achieved even when the backup terminal unit 150 is added to the CATV system of the first embodiment shown in FIG. 1, to the CATV system of the second embodiment shown in FIG. 7, to the CATV system of the third embodiment indicated in FIG. 8, and also to the CATV system of the fourth embodiment represented in FIG. 9.

What is claimed is:

1. A CATV (cable television) system comprising:
a text-system host computer for outputting text data and having a disclosed protocol;
an image-data-system host computer for outputting image data and having an undisclosed protocol;
an image-data-system terminal connected to said image-data-system host computer, for displaying an image in response to said image data outputted from said image-data-system host computer;
a video control unit connected to said image-data-system terminal, for acquiring said image data from said image-data-system terminal to process said acquired image data;
a data management unit including means for acquiring said text data from said text-system host computer according to said disclosed protocol, said data management unit (a) acquiring the processed image data from said video control unit, (b) decrypting said text data and (c) outputting said text data and said processed image data;
a signal transmitting unit connected to said data management unit, for transmitting said processed image data and said text data received from said data management unit;
a cable for transmitting said processed image data and said text data outputted from said signal transmitting unit; and
a display unit connected via said cable to said signal transmitting unit, for displaying an image thereon in response to said processed image data and said text data both of which are acquired from said signal transmitting unit via said cable.

2. A CATV system as claimed in claim 1, further comprising:
a monitor camera for outputting a television signal;
a microphone terminal for inputting an emergency voice signal and an emergency broadcasting command; and
a tuner terminal interposed between said cable and said display unit, wherein:
said data management unit receives said emergency broadcasting command outputted from said microphone terminal;
said signal transmitting unit transmits said television signal outputted from said monitor camera, said emergency broadcasting command outputted from said data management unit, and said emergency voice signal outputted from said microphone terminal other than said processed image data and said text data; and
said tuner terminal selects any one of said emergency voice signal, said processed image data, said text data, and said television signal all of which are received from said signal transmitting unit via said cable, and outputs the selected signal to said display unit.

3. A CATV system as claimed in claim 2 wherein:
said data management unit compresses said processed image data into compressed image data, and converts both of said text data and said compressed image data into HDLC (high level data link control procedure) frame data;
said signal transmitting unit transmits said HDLC frame data received from said data management unit; and
said tuner terminal includes:
television signal receiving means for receiving said television signal from said signal transmitting unit via said cable;
voice receiving means for receiving said emergency voice signal from said signal transmitting unit via said cable;

data receiving means for receiving said HDLC frame data from said signal transmitting unit via said cable;

analyzing means for converting said HDLC frame data received from said data receiving means into said text data and said compressed image data;

a memory for storing therein said text data and said compressed image data both of which are received from said analyzing means;

channel number receiving means for receiving a channel number;

channel content judging means for comparing said channel number received from said channel number receiving means with a previously registered channel number, and for causing said television signal receiving means to receive the television signal in response to said channel number when said comparison indicates that a picture responsive to said television signal is to be displayed on said display unit;

text data decrypting means for acquiring said text data from said memory to decrypt a content of said text data when said comparison indicates that an image responsive to said text data is to be displayed on said display unit;

image data expanding means for acquiring said compressed image data from said memory to expand said compressed image data when the comparison indicates that an image responsive to said compressed image data is to be displayed on said display unit;

display control means for producing a display signal in response to either an output signal from said text data decrypting means, or an output signal from said image data expanding means; and picture signal switching means for causing said display unit to receive said television signal outputted from said television signal receiving means when as a result of said comparison, the picture responsive to said television signal is displayed on said display unit, and, on the other hand, for causing said display unit to receive said display signal outputted from said display control means when the image responsive to either said text data or said compressed image data is displayed on said display unit.

4. A CATV system as claimed in claim 1 wherein:

said data management unit has a dual structure comprising an operation system and a waiting system, which mutually monitor conditions of said operation system, wherein:

when said operation system detects a failure that happens to occur in said operation system during operation of said operation system, said operation system outputs a switching signal for operating said waiting system to enter a waiting mode; and on the other hand, when said operation system itself does not detect said failure, but said waiting system detects the occurrence of said failure, said waiting system causes switching from said operation system to said waiting system in said waiting mode.

5. A CATV system as claimed in claim 4 wherein:

said data management unit outputs a switching signal indicating that said operation system and said waiting system are switched; and said signal transmitting unit includes:

first communication control means connected to said operation system of said data management unit, for converting said HDLC frame data and said emergency broadcasting command received from said operation system into digital signals;

second communication control means connected to said waiting system of said data management unit, for converting said HDLC frame data and said emergency broadcasting command received from said waiting system into digital signals; and switching means for receiving any one of said digital signals derived from said first communication control means and said digital signals derived from said second communication control means in response to said switching signal.

6. A CATV system as claimed in claim 5 wherein:

said first communication control means is connected to both of said operation system and said waiting system of said data management unit by way of a LAN (local area network) of a transmission control protocol/internet protocol procedure;

said second communication control means is connected to both of said operation system and said waiting system of said data management unit by way of said LAN of the transmission control protocol/internet protocol procedure;

when each of said first and second communication control means is brought into a receivable condition with respect to said operation system and said waiting system of said data management unit, a message indicating said receivable condition is announced;

when said operation system and said waiting system of said data management unit do not receive said message that one of said first and second communication control means is under said receivable condition, from one of said first and second communication control means, said operation system and said waiting system output said HDLC frame data and said emergency broadcasting command to the other of said first and second communication control means.

7. A CATV system as claimed in claim 1, further comprising:

a backup terminal connected to said data management unit, wherein:

said backup terminal receives said text data and said processed image data from said data management unit for temporary storage therein, when a failure happens to occur in at least one of said text-system host computer, said image-data-system host computer, a transmission path from said text-system host computer to said data management unit, and a transmission path from said image-data-system host computer to said data management unit, said backup terminal adds information which should be transmitted after the occurrence of said failure to said temporarily stored text data and processed image data, and then transmits the resultant data to said data management unit.

* * * * *